United States Patent
Ishiwata et al.

(10) Patent No.: US 7,552,038 B2
(45) Date of Patent: Jun. 23, 2009

(54) INFORMATION PROCESSOR FOR SUPPORTING A SHEET FEEDING MACHINE DESIGN

(75) Inventors: Kazuhiko Ishiwata, Chiba (JP); Kazuhito Watanabe, Chiba (JP); Toshihiko Horikoshi, Ibaraki (JP); Kazuki Nakanishi, Ibaraki (JP); Takashi Kano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 394 days.

(21) Appl. No.: 10/936,612

(22) Filed: Sep. 8, 2004

(65) Prior Publication Data
US 2005/0055186 A1 Mar. 10, 2005

(30) Foreign Application Priority Data
Sep. 9, 2003 (JP) ............................. 2003-316942

(51) Int. Cl.
*G06G 7/48* (2006.01)
(52) U.S. Cl. .............................................. 703/6; 703/7
(58) Field of Classification Search .................... 703/6, 703/7
See application file for complete search history.

(56) References Cited

U.S. PATENT DOCUMENTS 5,844,819 A * 12/1998 Fujinuma ...................... 703/7
7,119,805 B2 * 10/2006 Batori et al. ................. 345/419

OTHER PUBLICATIONS

Dymola Kynamic Modeling Laboratory User's Manual Version 5.0 1992-2002. pp. 13, 104-107, 109-112.*

* cited by examiner

*Primary Examiner*—Paul L Rodriguez
*Assistant Examiner*—Eunhee Kim
(74) *Attorney, Agent, or Firm*—Canon U.S.A. Inc., I.P. Division

(57) ABSTRACT

It is an object of the present invention to provide a simulation tool, which can overcome complications of examinations by simulations as described above and can provide a designer with easy examinations. A simulation based on a design parameter of a unit is implemented. Furthermore, a simulation result implemented by the control device is output on a display screen as a graph. Then, the unit design parameter is corrected in accordance with a correction in the graph displayed on the display screen. Thus, the simulation can be retried easily.

10 Claims, 18 Drawing Sheets

With reference to the friction coefficient DB under MATERIAL, material is selected from the table and, at the same time, a corresponding friction coefficient is automatically input.

PARAMETER TABLE

| PAPER FEEDING PATH LENGTH |
| SHEET SENSOR B POSITION |

INFORMATION PROCESSOR FOR SUPPORTING A SHEET FEEDING MACHINE DESIGN

BACKGROUND OF THE INVENTION

1. Field of the Invention

The present invention relates to an information processor and method for supporting unit design such as sheet feeding design.

2. Description of the Related Art

In recent years, a simulator is generally used to examine a design by using three-dimensional CAD data created before an actual machine is produced.

For example, examining a designed apparatus, such as a copier and a laser beam printer, for feeding a sheet consumable item such as paper has been demanded before a prototype apparatus is actually produced based on the design.

In order to examine a paper feeder design, a designer may model a paper feeder unit by three-dimensional CAD, define a main section, and create a two-dimensional drawing for providing a section of the paper feeder unit. Then, the designer may create a drawing having, as additional information, parameters of units required for performing a simulation of paper-feeding, such as a paper path, a sensor, a feeding roller, a mylar and a flapper.

FIGS. 10 and 11 show display examples of feeding analysis results. FIG. 10 shows a relationship between performance of sensors (PS-A and PS-B) and motors/a clutch (Al-a, Al-b and B) disposed at positions through which paper virtually passes and a time axis in a paper feeding design. These sensors detect whether a sheet passes therethrough or not. FIG. 11 is a diagram (sheet line diagram) illustrating a total distance that a sheet travels with respect to a time from which the sheet begins to move.

However, performing a sheet feeding simulation only once is generally difficult to obtain an optimum condition for a sheet feeding design. Therefore, a simulation must be repeated with randomly changed parameters for a 3D-model of a paper feeder.

SUMMARY OF THE INVENTION

It is an object of the present invention to provide a simulation tool, which can overcome complications of examinations by simulations as described above and can provide a designer with easy examinations.

In order to achieve at least one of these objects, in an information processor according to one aspect of the invention, a simulation based on a design parameter of a unit is implemented. Furthermore, a result from the simulation implemented by the control device is output on a display screen as a graph. Then, the unit design parameter is corrected in accordance with a correction in the graph displayed on the display screen. Thus, the simulation can be retried easily.

The other objects and features of the invention will be apparent from following descriptions and drawings.

Further objects, features and advantages of the present invention will become apparent from the following description of the preferred embodiments with reference to the attached drawings.

DESCRIPTION OF THE PREFERRED EMBODIMENTS

Embodiments of the invention will be described below in detail with reference to drawings.

Figure 2:
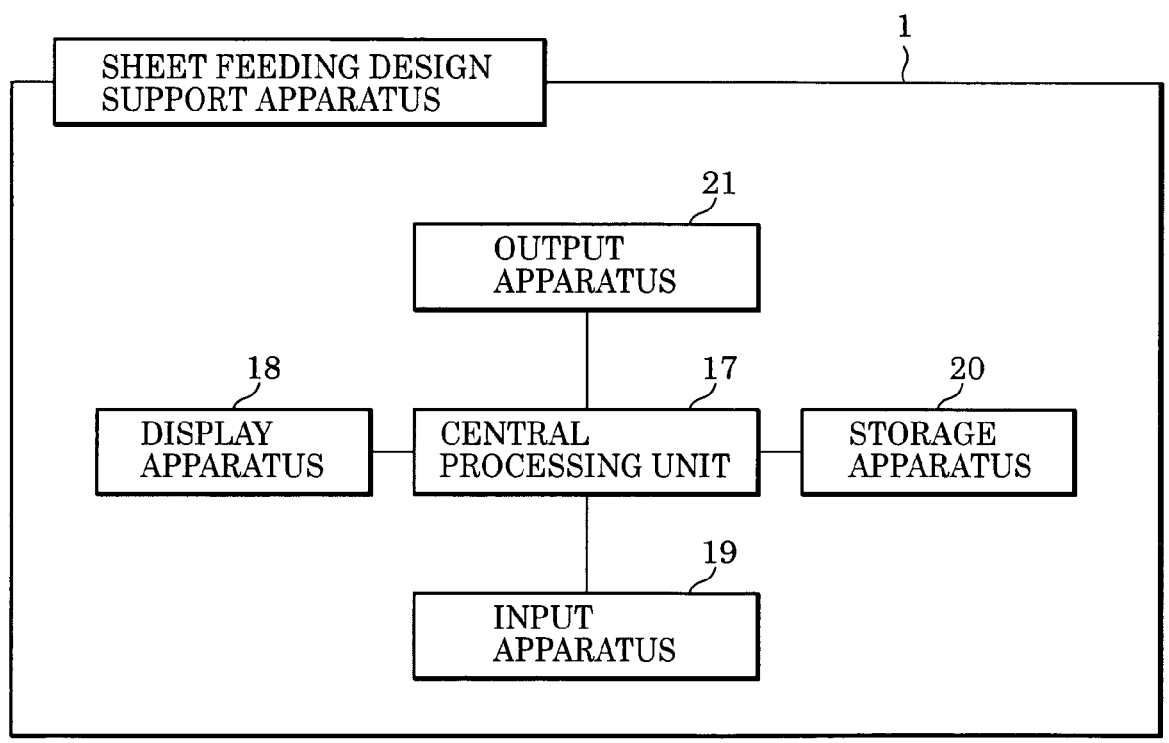
FIG. 2 is a block diagram showing a schematic construction of an information processor (3D sheet feeding simulator) as a paper feeding design supporting apparatus according to an embodiment of the invention.

FIG. 2 is a block diagram showing a schematic construction of a design supporting apparatus for designing a sheet feeding mechanism, such as a copier, according to an embodiment of the invention.

In FIG. 2, a sheet feeder design supporting apparatus 1 is an information processor including a central processing unit (CPU) 17, a display apparatus 18, an input apparatus 19, a storage apparatus 20, and an output apparatus 21.

In the sheet feeding design support apparatus 1 shown in FIG. 2, the central processing unit (CPU) 17 processes an input parameter or form in accordance with an instruction input from the input apparatus 19. The display apparatus (display) 18 displays an obtained simulation result as three-dimensional form and design input (parameters and path information) information. Furthermore, the display apparatus 18 displays developments during simulation processing.

The input apparatus 19 includes a keyboard, a mouse and/or a pointing device. The input apparatus 19 can be used to input selection information required for operations, input information, select items under a menu, or input other instructions.

The storage apparatus 20 stores various programs for implementing operations of the information processor, such as a parameter input/output program, data corresponding to a 3D model and information such as a simulation result for the model. The output apparatus 21 may be a printer for printing information displayed on the display apparatus 18, such as design input information (parameters and/or information relating to a paper feeding path), data corresponding to a 3D model and a simulation result, or a network interface for outputting the information as information data to another design supporting apparatus.

Here, the storage apparatus 20 includes at least one selected from a read-only memory (ROM), a random access memory (RAM), a hard disk drive (HDD) and a separate external storage apparatus. The storage apparatus 20 stores programs for implementing processes and design information on a 3D model.

The hardware construction of the information processor does not have to be a specific apparatus and may be a generic computer system such as a personal computer.

According to this embodiment, programs and parameter information such as unit forms to be designed are stored in a ROM and a RAM or a hard disk, respectively, in the storage apparatus 20. Then, selection information required for processing is selected through the input apparatus 19, and the operation result is re-displayed on the display apparatus 18. Parameters/model data can be stored in the storage apparatus 20.

Next, a specific operation of a sheet feeder design support apparatus according to the first embodiment will be described in accordance with steps by a user with reference to the flowchart in FIG. 1 and the construction diagram of the sheet feeder design supporting apparatus 1 in FIG. 2.

[Input Part Form and Position Information] at [Step ST0]

First of all, a user models (renders) outside shapes and positions of parts included in a paper feeder unit by using a CAD system.

[Input Details of Part Attribute] at [Step ST1]

First of all, an attribute group relating to paper feeding of each part included in the modeled paper feeder system mainly include six attributes, "feeding guide", "feeding roller", "mylar", "flapper", "sensor" and "paper path". Then, each unit is defined by assigning any one of these six part attributes thereto.

Figure 3A:
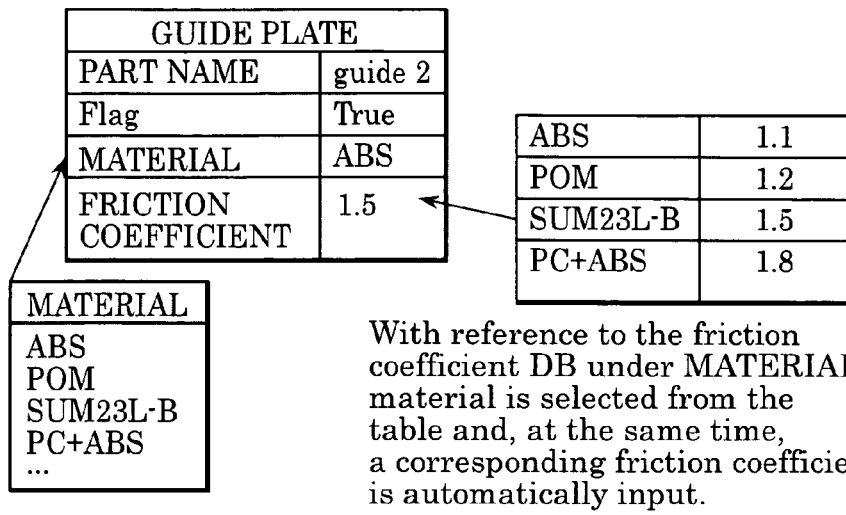
FIGS. 3A and 3B are diagrams showing an example of a display screen for inputting parameters.

Like the screen shown in FIG. 3A, a designer defines a parameter for each modeled unit. For example, a material as a parameter of a guide plate is determined with reference to a friction coefficient of the guide plate, for example, in a parameter database (DB) (not shown).

Figure 3B:
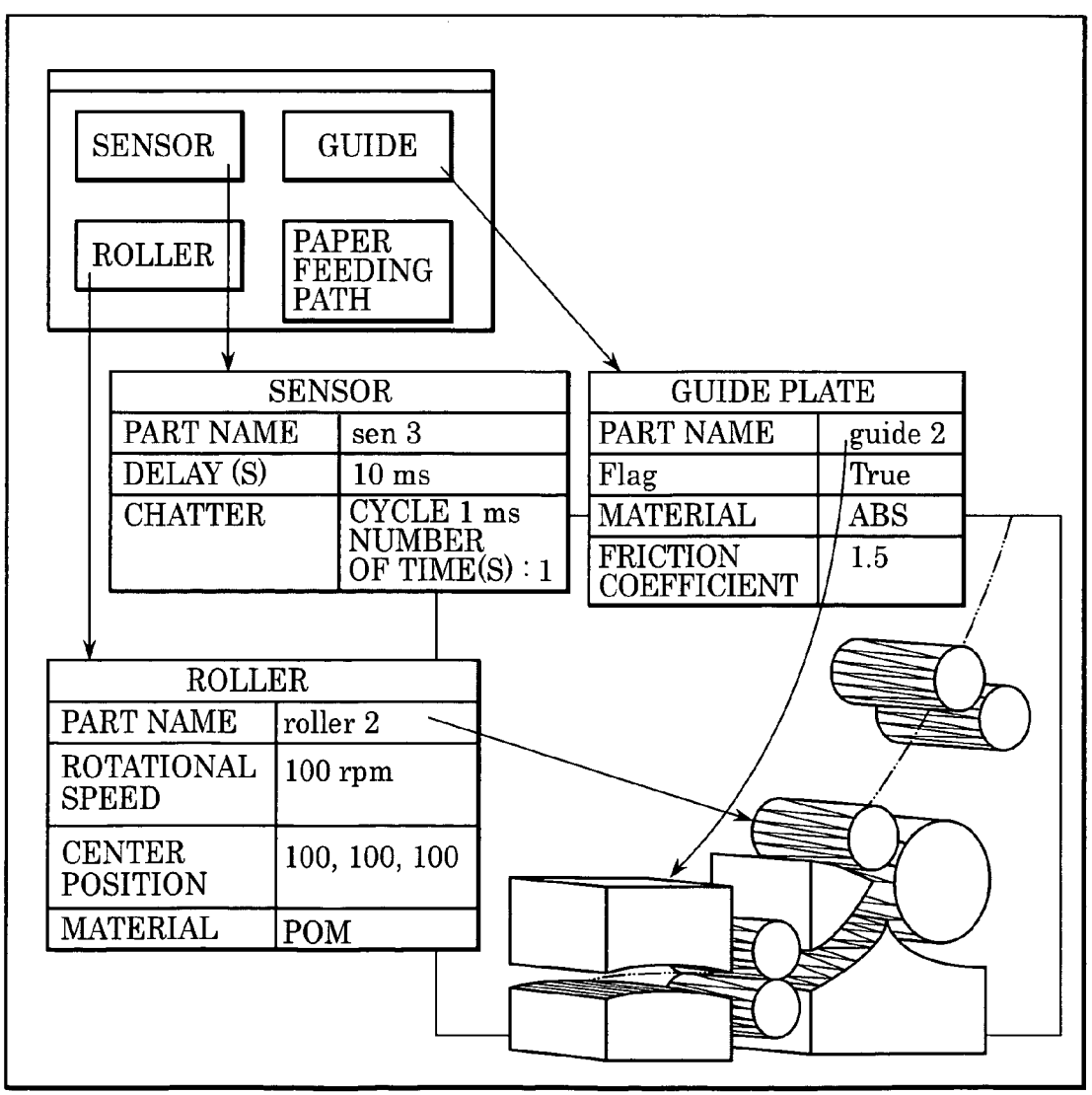

FIG. 3B is a diagram illustrating a preferred example of an input screen on which parameters of parts are defined. On the upper window in FIG. 3B, buttons having attribute names (SENSOR, GUIDE, ROLLER and PAPER FEEDING PATH) in a predetermined attribute group are displayed. (For simple description, buttons for attributes relating to a mylar and a flapper are not shown here.) For example, SENSOR is selected, a window is displayed having a delay and chatter as parameter items under drive conditions. A user can select a desired item to change the value of the parameter.

[Create Section Diagram of Feeder System Unit/Add Attribute of Section Diagram] at [Steps ST2/ST3]

Next, a main section is defined for a feeder unit in a three-dimensional space. Subsequently, a section diagram of the feeder unit is created on the defined main section.

Design information according to this embodiment includes a feeder unit in a three-dimensional space and a section of the created feeder unit.

Figure 1:
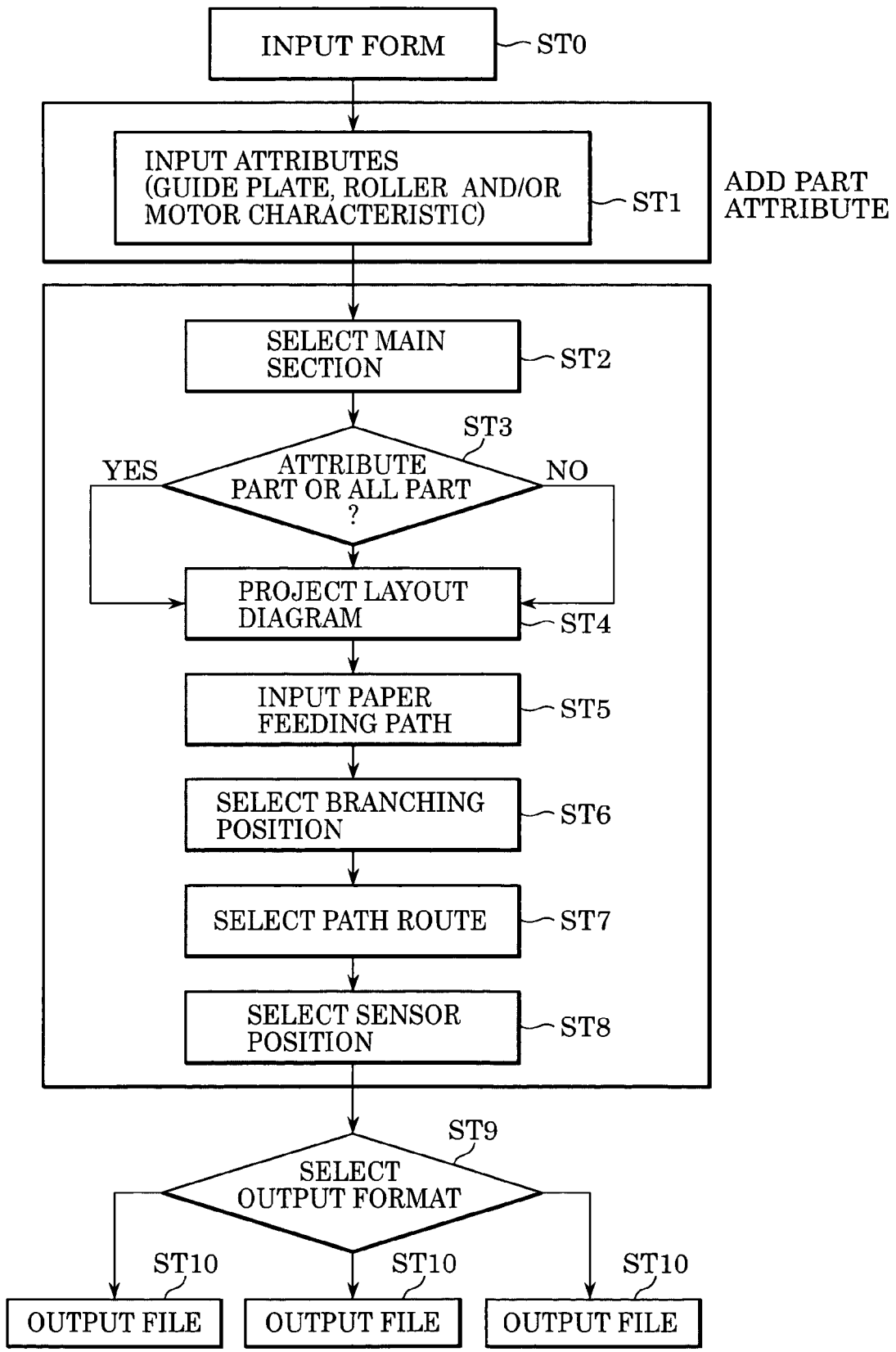
FIG. 1 is a flowchart showing an outline of a simulation operation by an information processor.
Figure 4:
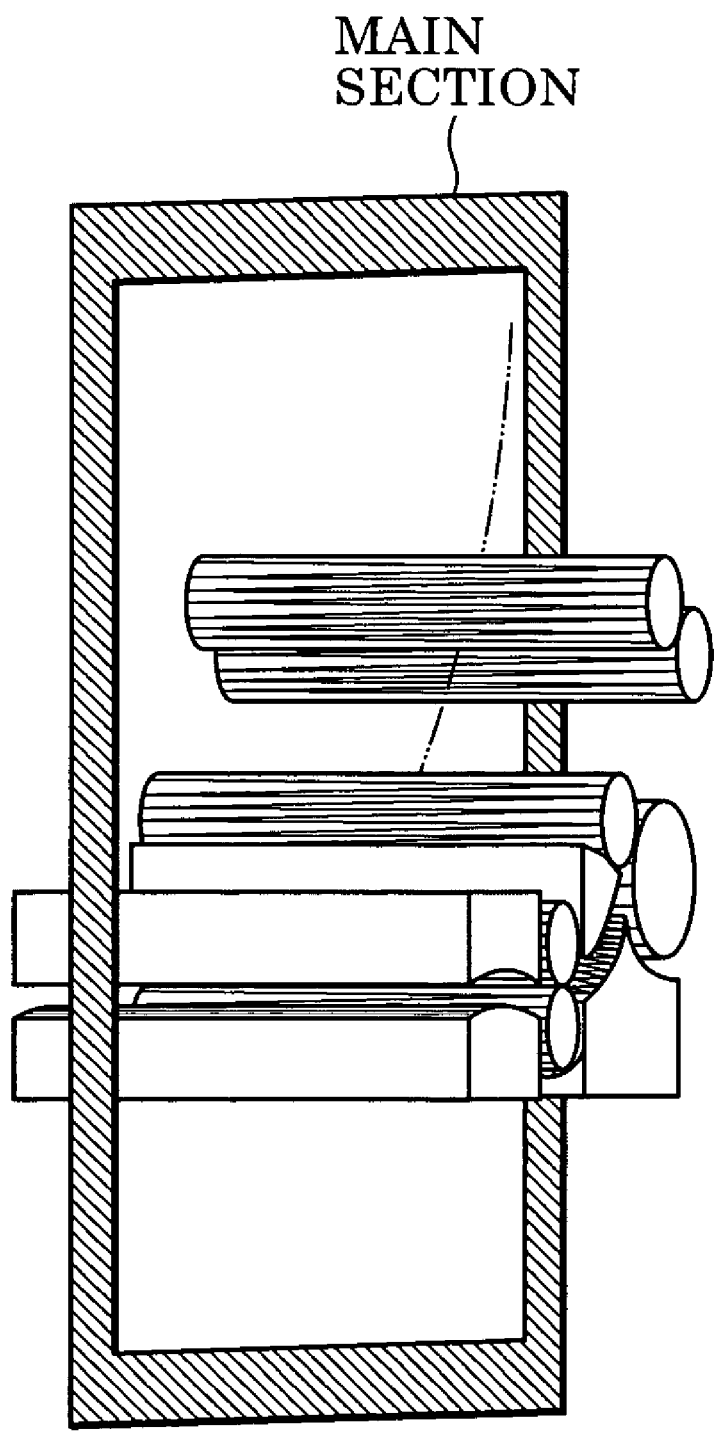
FIG. 4 is a diagram showing an example of a display screen for defining a main screen of a paper feeder unit.

FIG. 4 is a diagram illustrating an example in which a main section of a paper feeder unit is defined at a step ST2 in FIG. 1. In FIG. 4, a two-dimensional main section is defined in a three-dimensional space, and the main section is displayed on the screen. The main section is defined in perpendicular to the longitudinal direction of the feeding roller of the feeder unit and at the center of the feeding roller.

At a step ST3 in FIG. 1, it is selected whether parts (screws/exterior parts and so on) not relating to the paper feeder system are projected on the main section or not or parts having ON flags and relating to the paper feeder system, such as the feeding guide attribute, feeding roller attribute, mylar, flapper and sensor attribute defined at the step ST1 in FIG. 1 are only projected or not.

[Project Section Diagram] at [Step ST 4]

Next, a section diagram of a part selected on the main section at the step ST3 is created.

Figure 5:
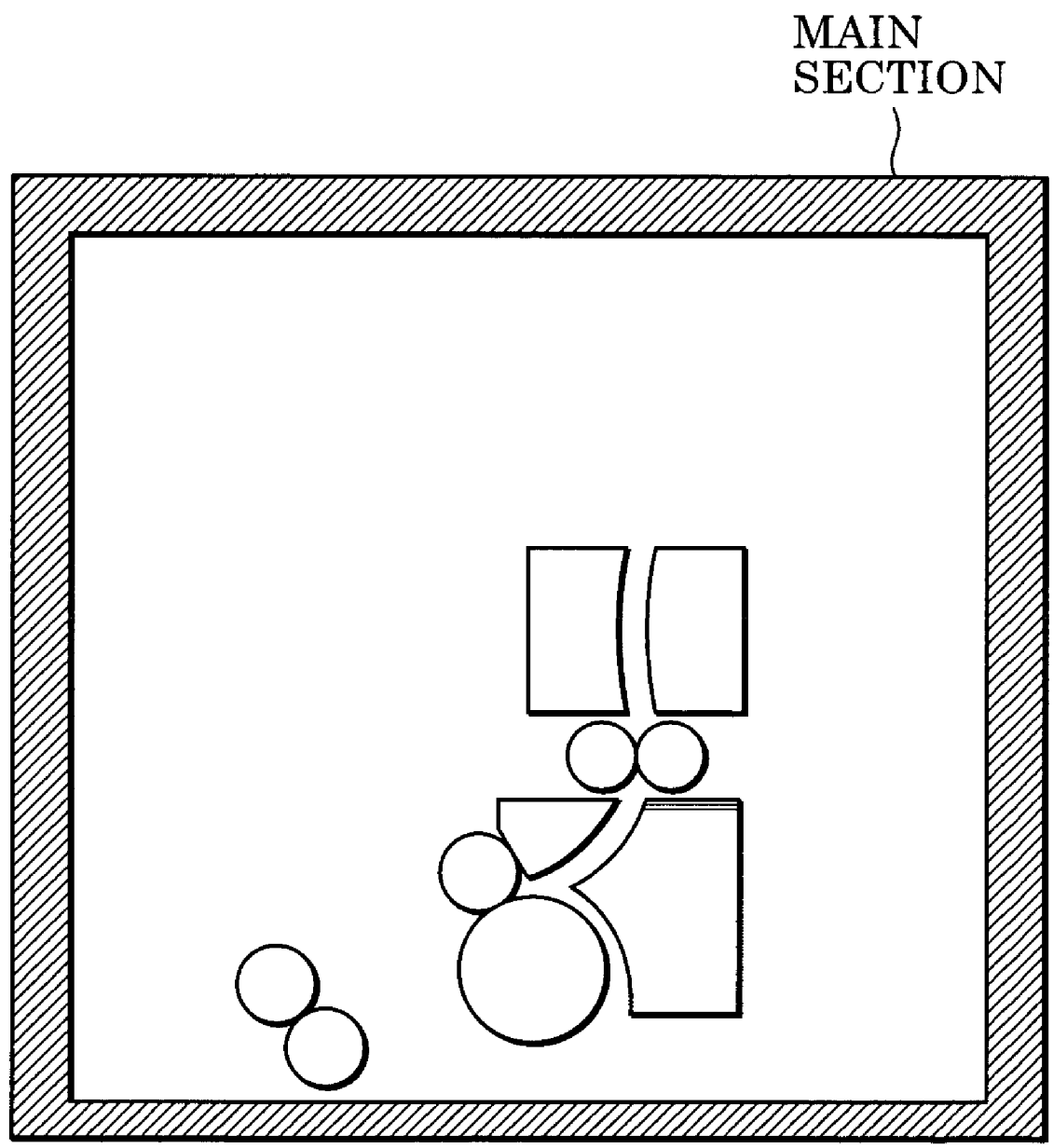
FIG. 5 is a diagram illustrating an example of a display screen of a main section after projection processing is performed.

FIG. 5 is a diagram showing an example of the main section created by the projection processing at a step ST4 in FIG. 1. FIG. 5 shows a state in which a part to be projected in accordance with a selection at the step ST3 is projected. Thus, projecting only required projection parts can reduce the complexity of the diagram.

[Input Sheet Feeding Path] at [Step ST5]

Subsequently, a sheet feeding path is input for the main section shown in FIG. 5. The sheet feeding path is defined to extend between guides shown on the section diagram created by the step ST4.

Figure 6:
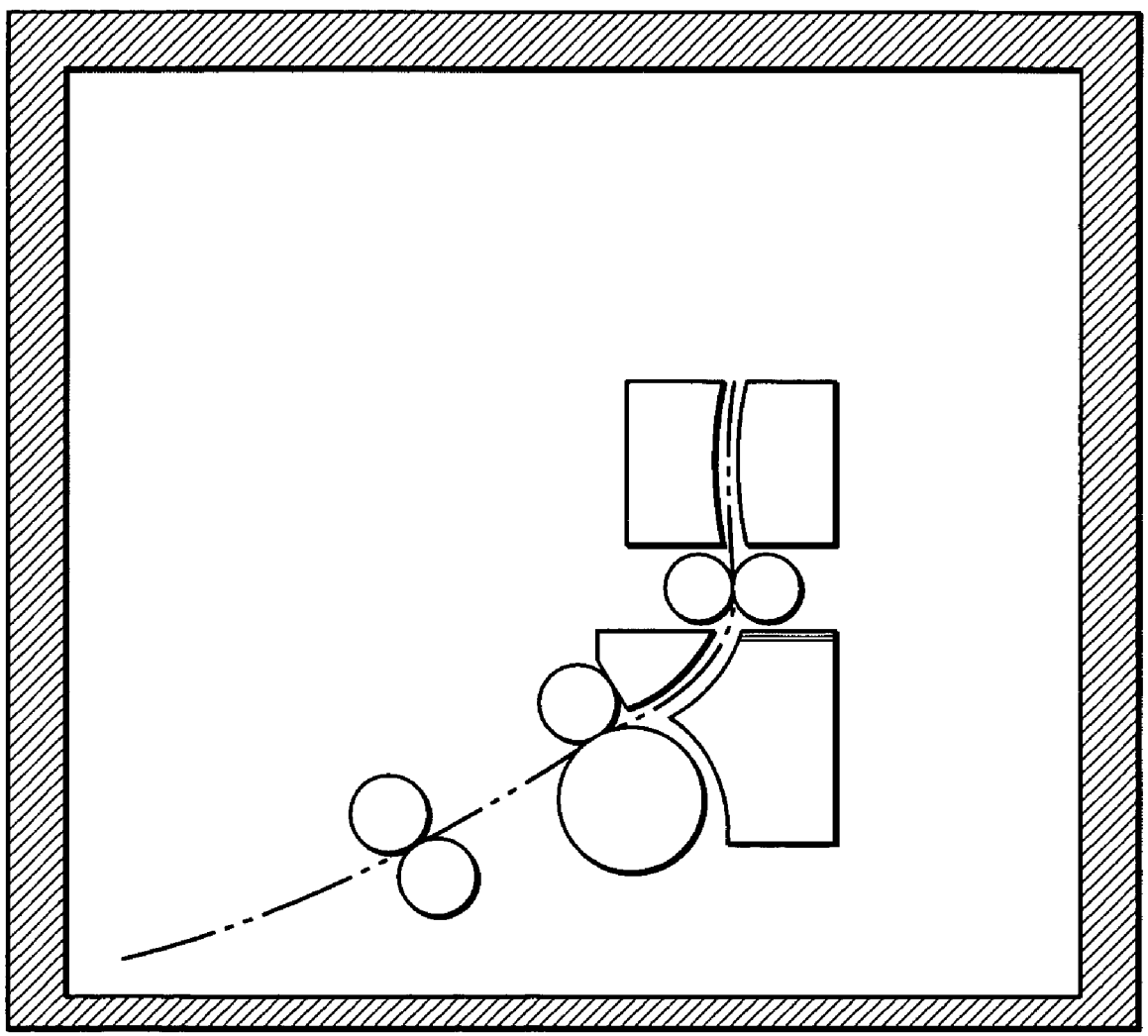
FIG. 6 is an example of a display screen having a paper path.

FIG. 6 is a diagram showing an example having the sheet feeding path input at the step ST5 in FIG. 1. The displayed guide elements include pairs of elements such as splines and arcs. A designer can define a general sheet feeding path by connecting the substantial centers of these elements.

[Select Branching Position] at [Step ST6]

When a loop path exists in the sheet feeding path defined at the step ST5, a branching position thereof is selected. When no loop path exists and defining a branching position is not required, the process goes to the next step as it is.

Figure 7:
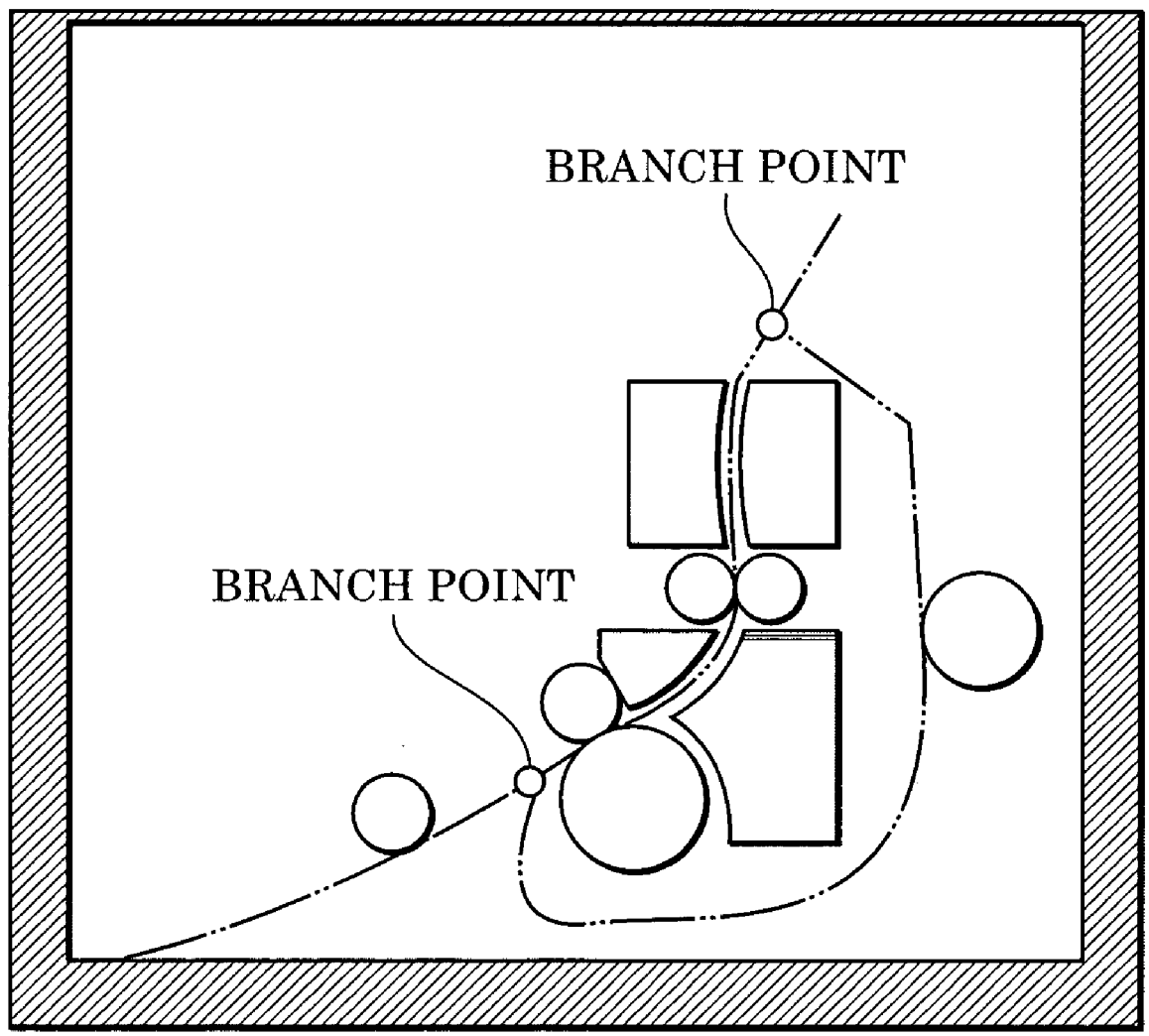
FIG. 7 is an example of a display screen having selected branching points on a section diagram.

FIG. 7 is a diagram illustrating an example having the input branching points on a section diagram. In FIG. 7, when the path has a branching point as a result of forming a closed loop based on a process such as double-side copying, a designer can divide elements on the path by providing branching points in the paper feeding path on the section diagram.

[Select Sheet Path Route] at [Step ST7]

Next, an order of paper feeding is defined on the defined sheet path.

Figure 8A:
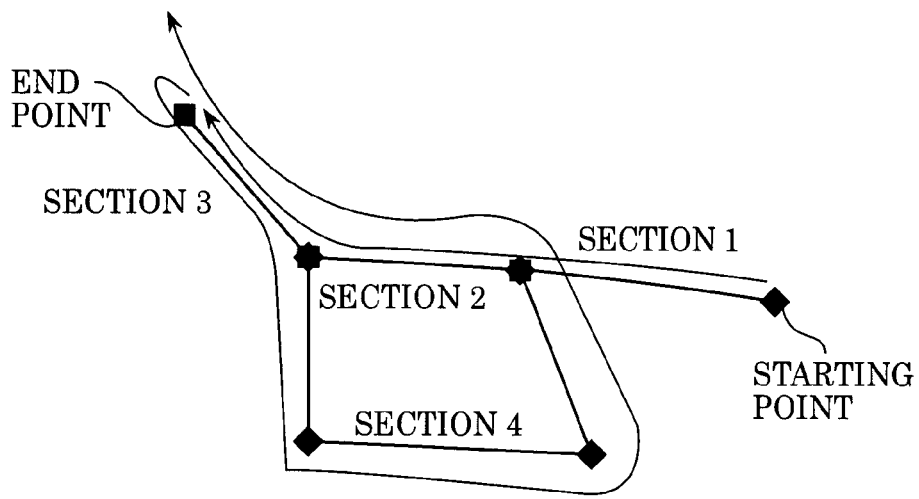
FIGS. 8A to 8C are an example of a processing flow for defining a route of sheet feeding.
Figure 8B:
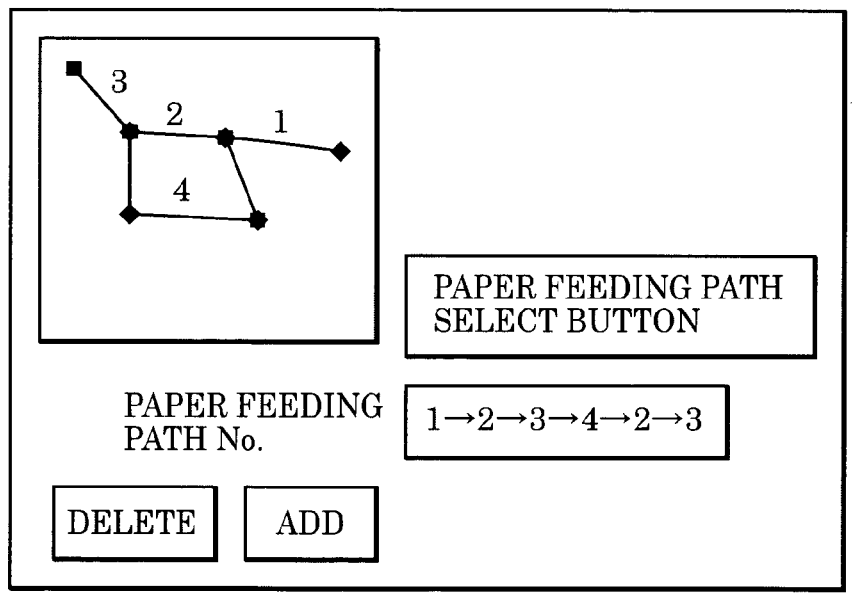
Figure 8C:
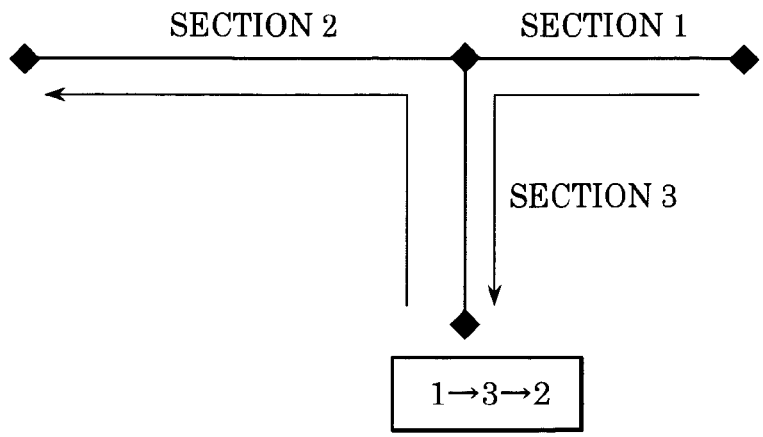

FIGS. 8A to 8C are diagrams illustrating an example in which a paper feeding route is defined. FIG. 8A shows a state in which an order for feeding a sheet is selected based on path elements divided at the step ST6 in FIG. 1. In order to feed a sheet in accordance with the arrow in FIG. 8A, a definition operation is started upon a manipulation on the PAPER FEEDING PATH SELECT BUTTON. Then, sheet sections are sequentially selected on the screen in accordance with a desired route. Upon completion of the definition operation, as shown in FIG. 8B, the arrangement of element numbers can be checked on the screen in an order of elements that sheets are to be fed. As shown in FIG. 8C, a sheet feeding path can be displayed schematically.

[Select Sensor Position] at [Step ST8]

When a sensor must be placed for determining whether paper is on a sheet path or not, a position for placing the sensor is defined. In order to place multiple sensors, points for the sensors are defined.

Figure 9:
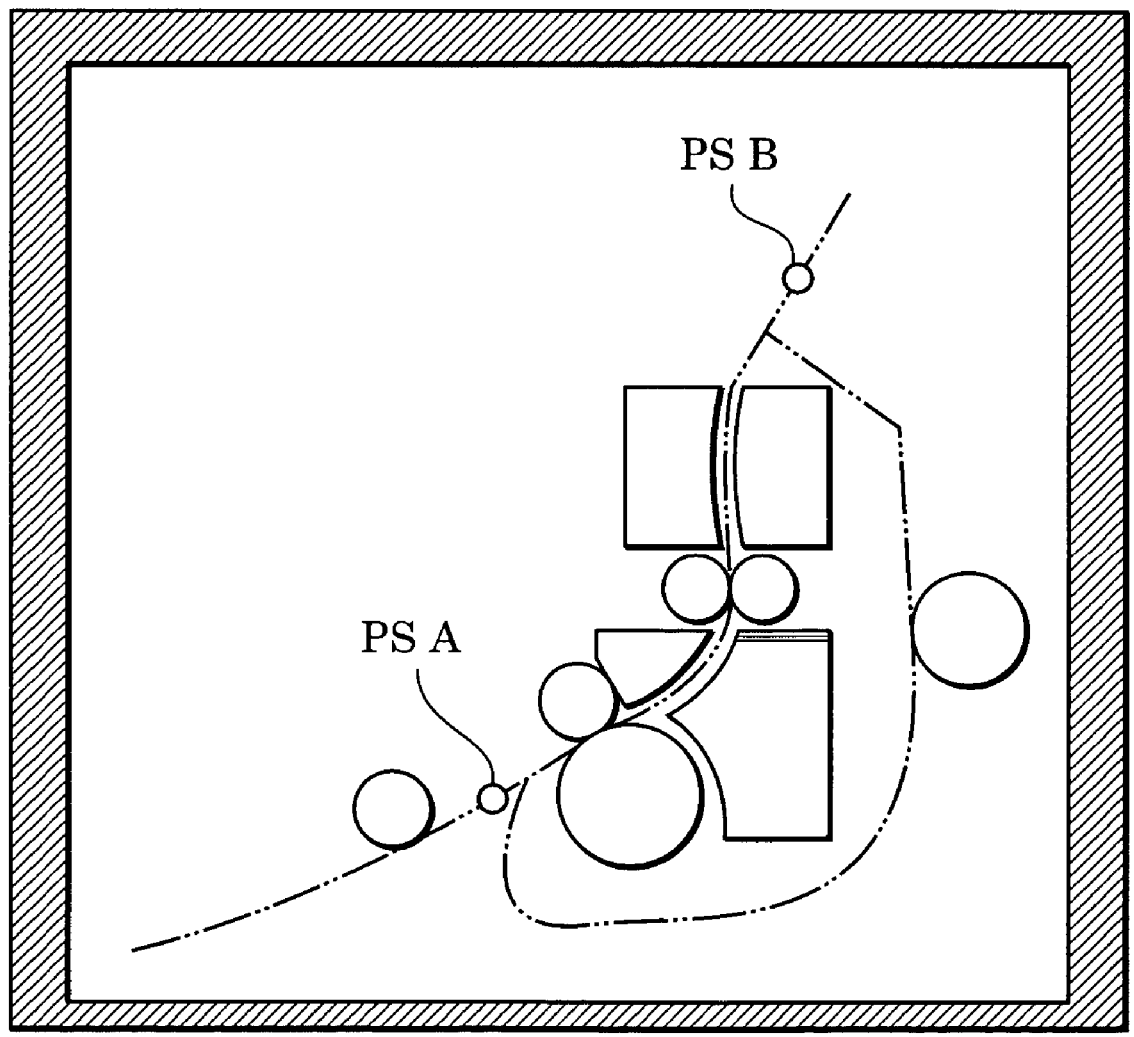
FIG. 9 is an example of a display screen having defined positions of sensors.

FIG. 9 is a diagram illustrating an example having defined sensor positions. In FIG. 9, positions of sensors are defined on the sheet feeding path defined up to the step ST6. More specifically, coordinate values of the sensors can be provided on the section diagram as attributes. The attribute information may be selected between local coordinates about the origin on the section diagram and entire coordinates in a 3D-space.

Through the steps ST2 to ST8, the section diagram is input with the settings of two-dimensional attributes relating to the paper-feeding path.

[Simulation] at [Step ST9]

Subsequently, based on the defined information as described above, a simulation for sheet feeding is performed by a process by the central processing unit 17. As a result of the simulation, sheet operation information, timing of sheet arrival at the sensors, motor control timing and so on are calculated.

[Display Simulation Result] at [Step ST10]

Figure 10:
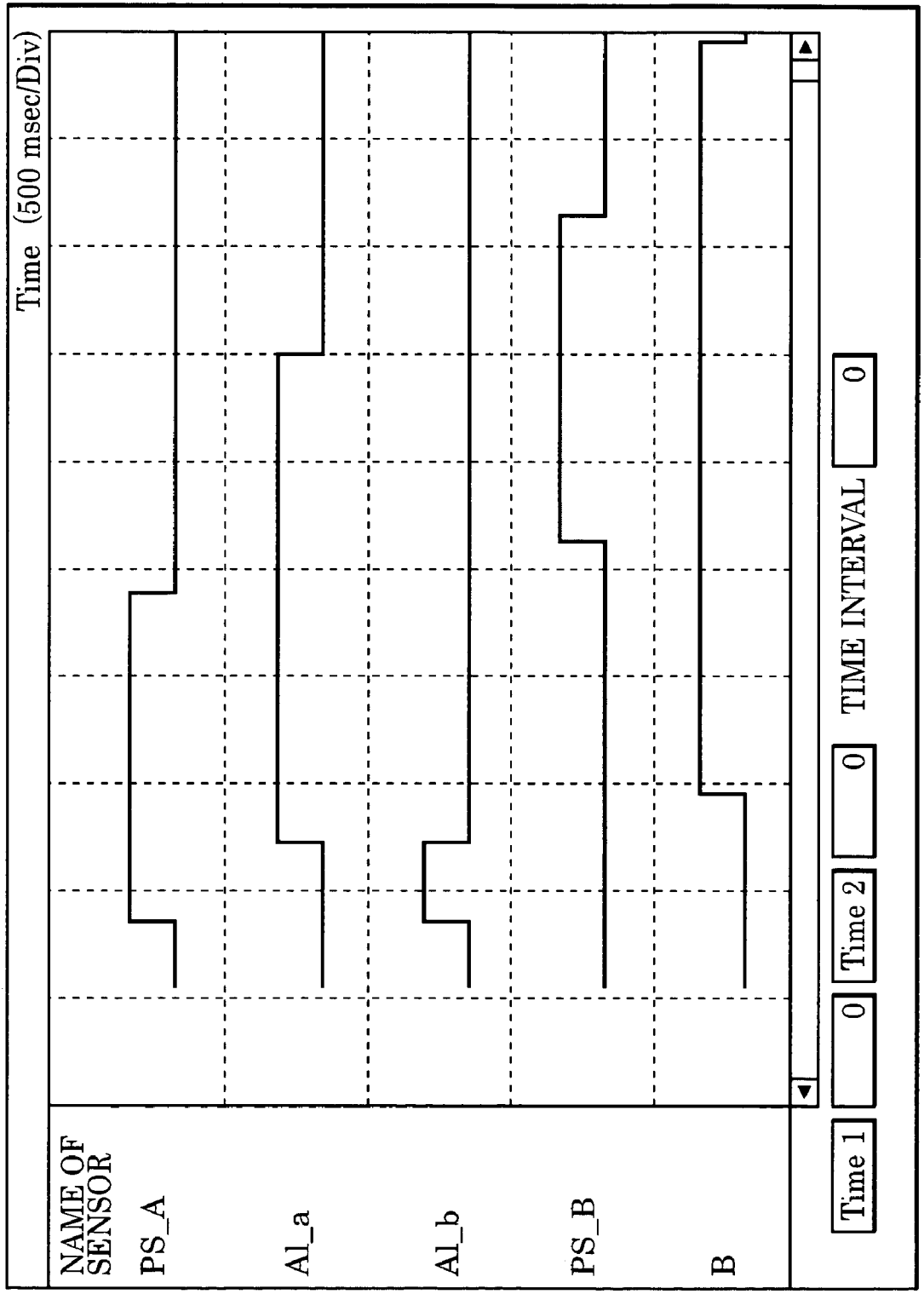
FIG. 10 is an example of a logic analyzer diagram (timing chart) resulting from a simulation.
Figure 11:
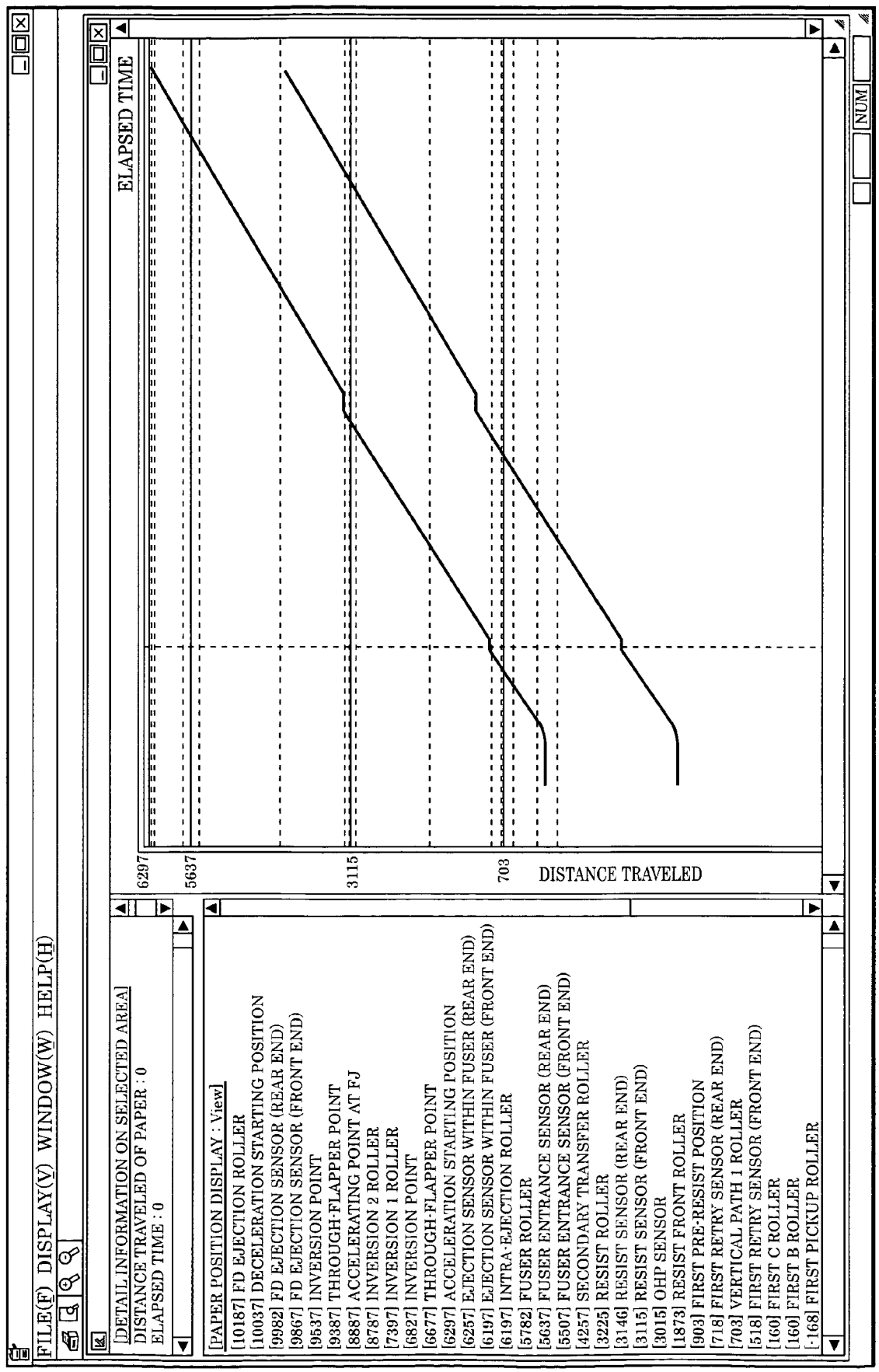
FIG. 11 is an example of a sheet line diagram resulting from a simulation.

Next, the sheet operation information and/or information on timing of sheet arrival at the sensors and/or motor control timing are processed which are the simulation results. Thus, a logic analyzer diagram (timing chart) shown in FIG. 10 and a sheet line diagram indicating a distance traveled of a sheet with respect to a sheet feeding time shown in FIG. 11 are displayed on the screen of the display apparatus 18.

Through these steps, results from the sheet feeding simulation can be obtained. According to this embodiment, a simulation can be easily retried by processing the data on the graph resulting from the simulation.

Figure 12:
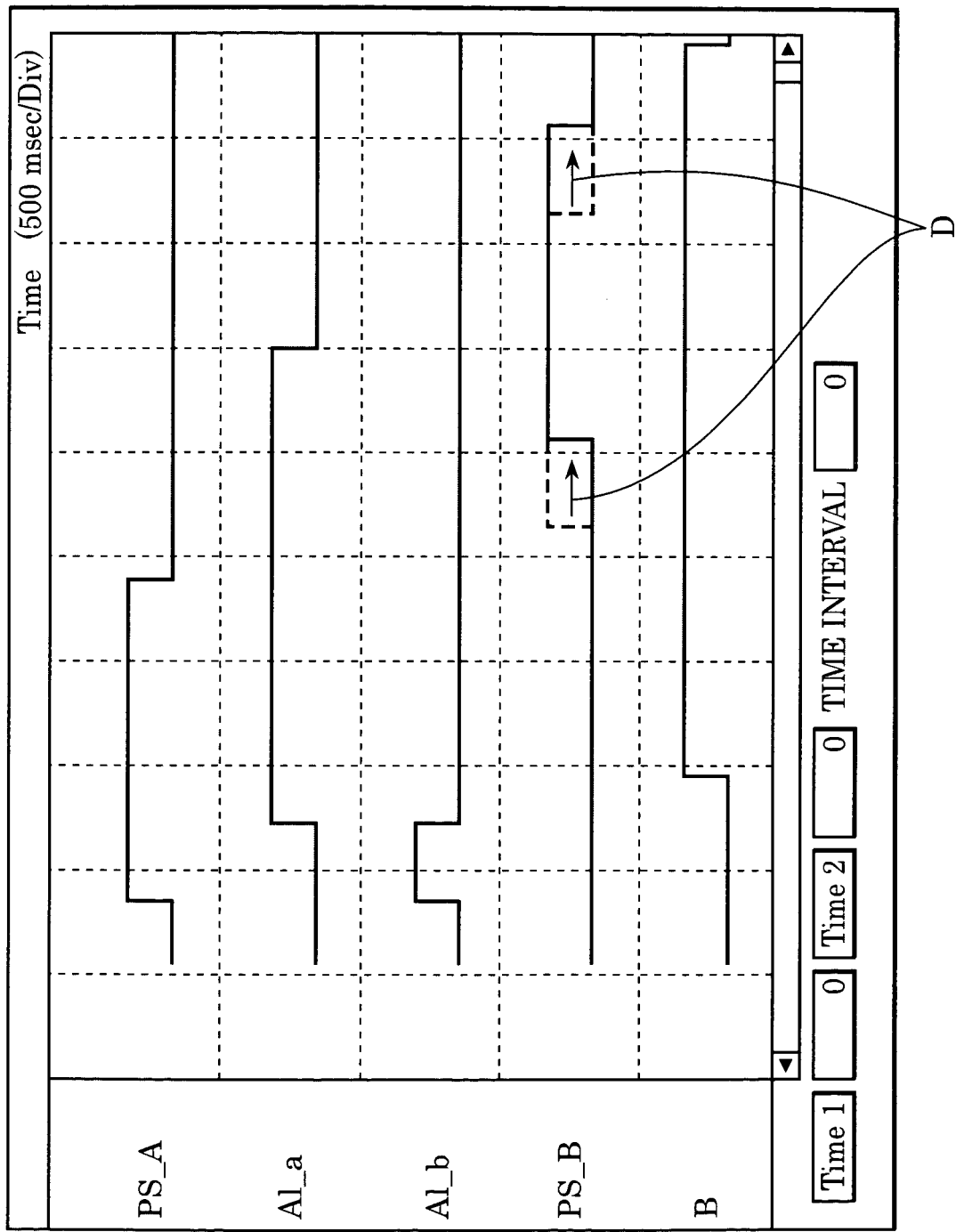
FIG. 12 is a diagram illustrating an example in which line data is corrected on a logic analyzer diagram resulting from a simulation.
Figures 13, 14:
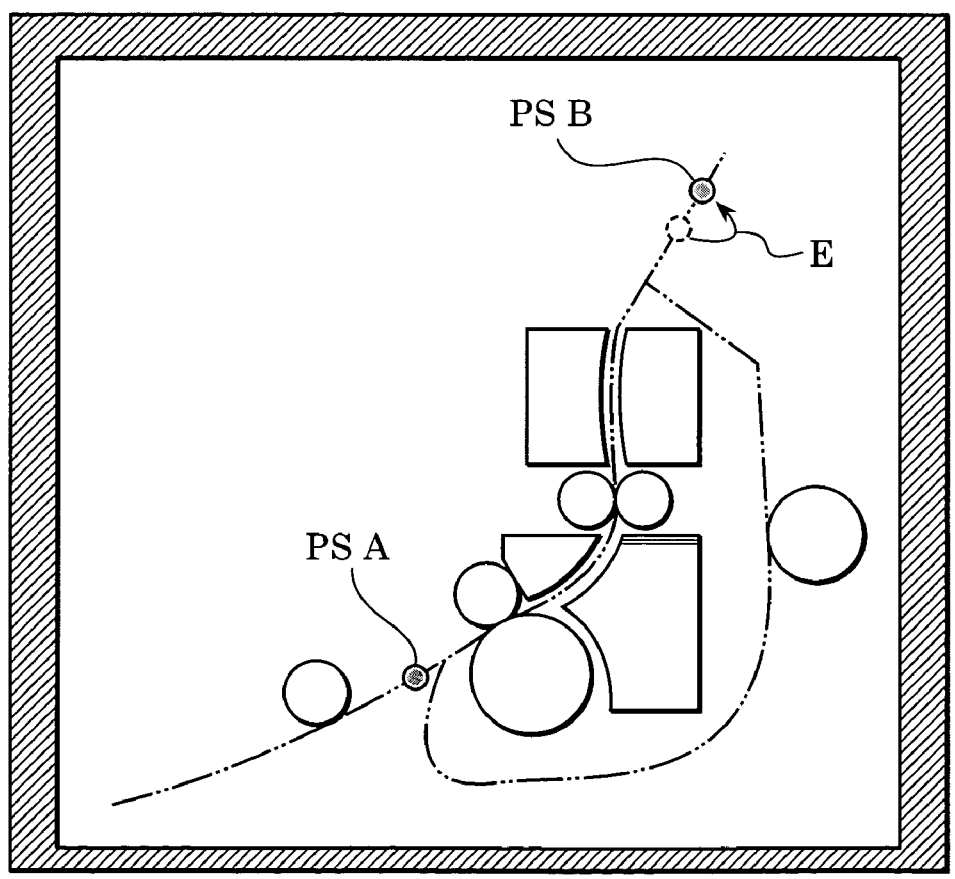
FIG. 13 is a diagram illustrating an example having one automatically corrected parameter of design information.
FIG. 14 is an example in which input data of design information is changed according to a second embodiment.
Figure 18:
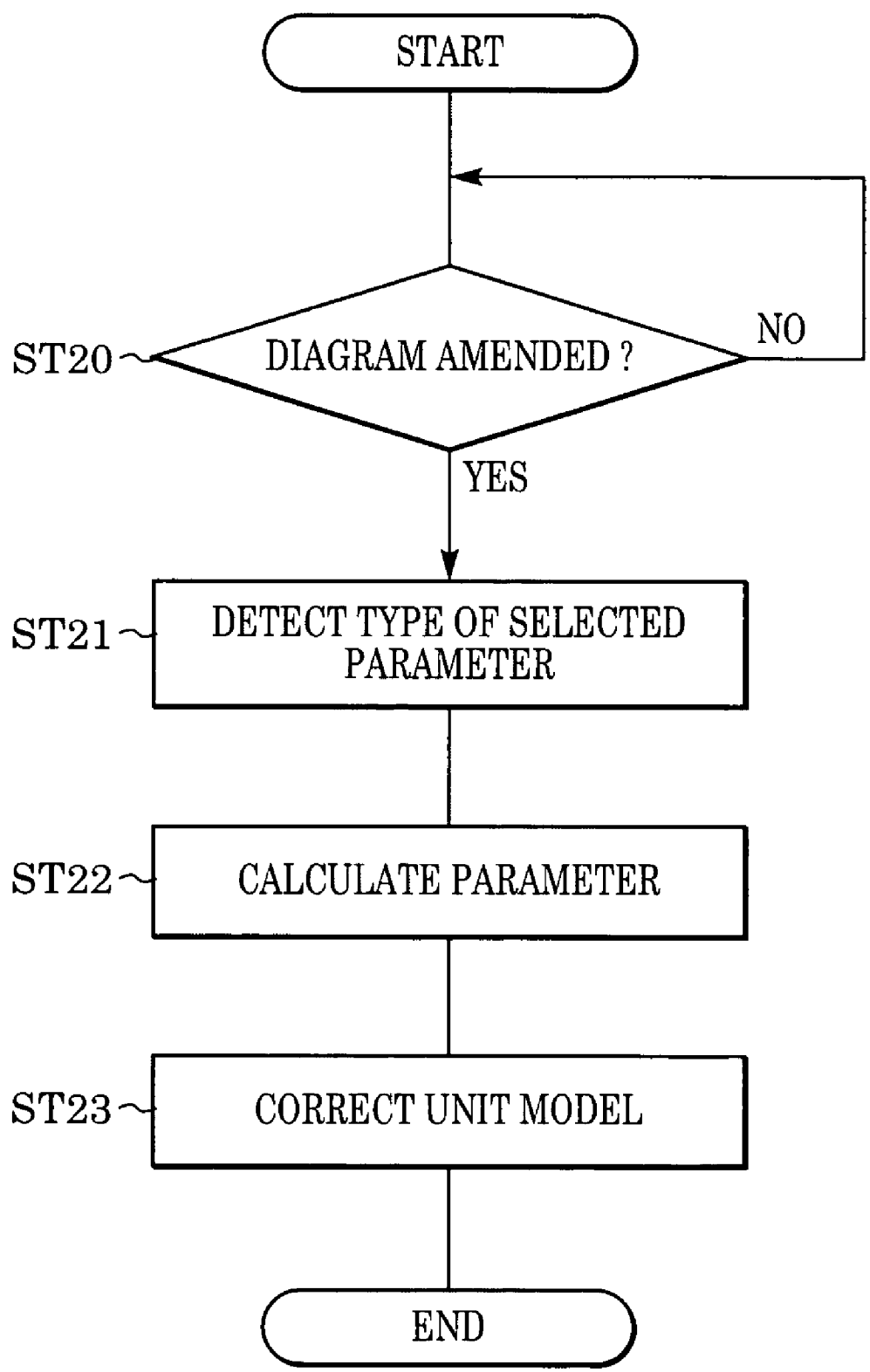
FIG. 18 is a flowchart of performance of the apparatus when a designer amends the diagram shown in FIG. 12.

For example, a designer may examine shifting of detection timing of the sheet sensor PS-B on the logic analyzer diagram on the screen of the display apparatus 18, as shown in FIG. 12. FIG. 12 is a diagram showing a relationship between sheet arrival times and positions of the sensors and motors. FIG. 18 is a flowchart of performance of the apparatus when a designer amends the diagram shown in FIG. 12. At first, the CPU 17 detects that the diagram has been amended by a designer (ST20). For example, as indicated by the arrow D in FIG. 12, line data displayed on the logic analyzer diagram is moved by a drag operation on the mouse of the input apparatus 19. Thus, a designer can correct the line data to desired timing. In accordance with the change due to the correction, the central processing unit 17 inversely computes values of the parameters to be corrected from the amount of change in detection timing (time difference in FIG. 12). Furthermore, as shown in FIG. 13, a parameter table of all design information involved in the change in detection timing is displayed.

A designer may select a type of parameter of an amended part of the designed model to be changed from the table. The CPU 17 detects that a parameter is selected by the designer (ST21). Furthermore, the CPU 17 calculates a value of the selected parameter on the basis of the amendment at the step ST20 (ST22). For example, a position of the sensor B is selected, the sensor position input at the step ST8 is calculated and corrected based on a sheet feeding speed calculated from the changed time difference and the diagram in FIG. 11 so as to obtain the corrected detection timing. Here, the correction is performed without departing from the sheet path. More specifically, as shown in FIG. 12, when line data is moved so as to delay the paper arrival time at the position of the sheet sensor PS-B by 500 msec., the position of the sensor PS-B is only moved to correct by (paper feeding speed*500 msec.). The paper feeding speed can be obtained from a distance from the beginning of the sheet feeding path to the position of the sensor PS-B and the arrival time in a simulation result, or from an inclination of the sheet line diagram shown in FIG. 11.

In accordance with the result of the calculation at the step ST22, the CPU 17 corrects the designed model (ST23). For example, the central processing unit 17 corrects not only the coordinates of the sensor B in the parameter table but also the position of the sensor PS-B on the main section diagram as indicated by the arrow E in FIG. 14. Here, since the original position of the sensor PS-B is indicated by the dashed line, the change in sensor position can be recognized immediately. At the same time, the original position information, which is the first design information, may be stored to return the sensor to the original position.

Figure 19:
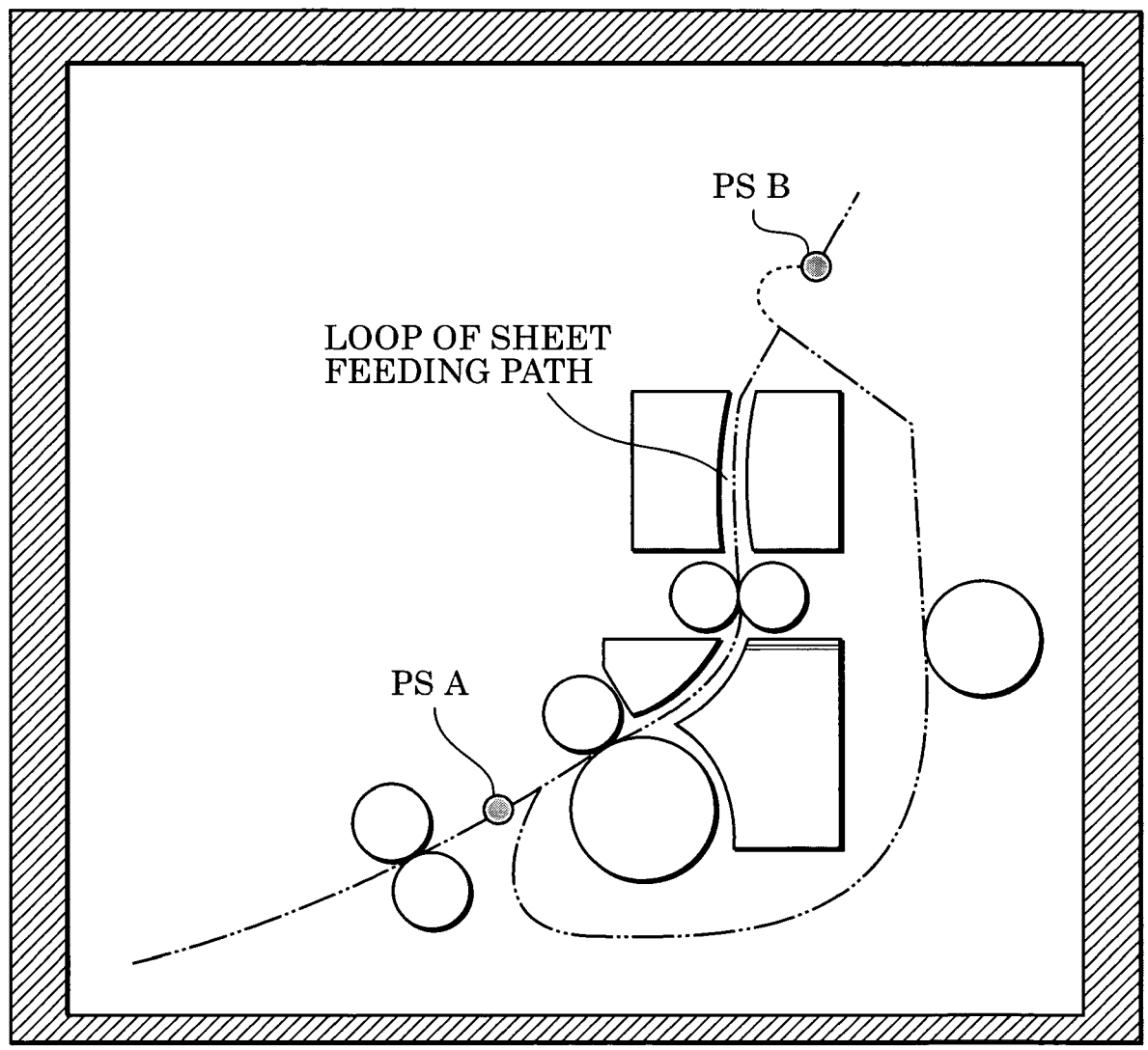
FIG. 19 is an example of a display screen having a corrected position of a sensor when a sheet feeding path length is selected as a parameter to be corrected.

Similarly, when a sheet feeding path length is selected as a parameter to be corrected, a sheet feeding path length from a branch point of a loop forming the sheet feeding path to the position of the sensor PS-B is corrected to increase by (paper feeding speed*500 msec.) in accordance with the corrected detection timing, as shown in FIG. 19.

As described above, according to this embodiment, based on the graph showing the simulation result, parameters such as a predetermined sensor position can be automatically corrected. Thus, an optimal condition for sheet feeding design can be obtained efficiently, and the efficiency of sheet feeding design can be improved significantly.

Data may be corrected by using graph data, which is simulation results, so that parameters of predetermined design information can be automatically corrected. Thus, the efficiency of sheet feeding design can be improved significantly.

Furthermore, since an inverse operation is automatically performed to automatically correct design information, an unnecessary simulation under design conditions based on wrong manual calculations can be prevented.

Since design information can be automatically corrected in response to a correction on simulation results, a designer never forgets correcting design information. Thus, disagreement between design information and simulation results thereof can be prevented.

Figure 15:
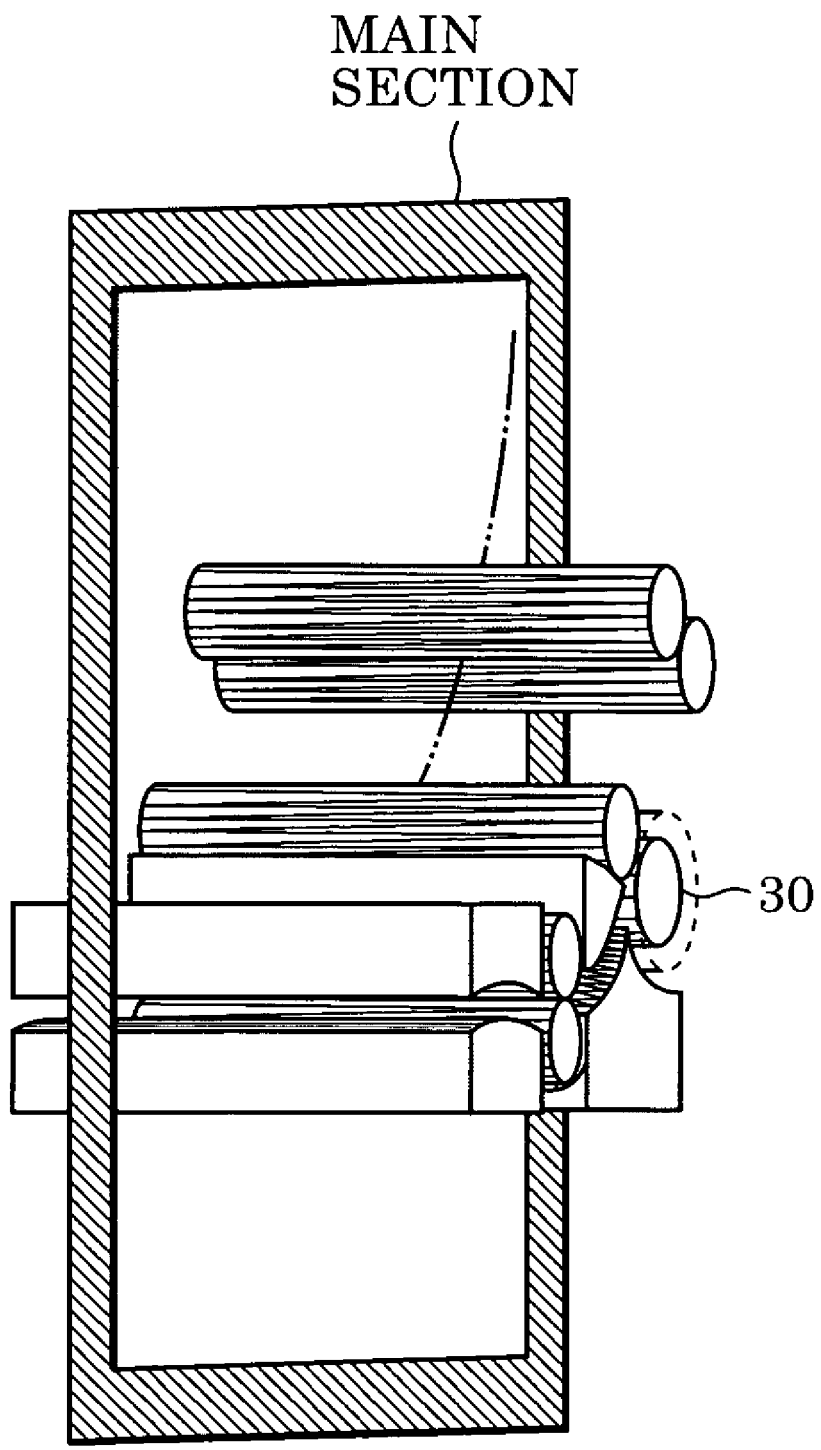
FIG. 15 is an example in which input data of design information is changed according to the second embodiment.
Figure 16:
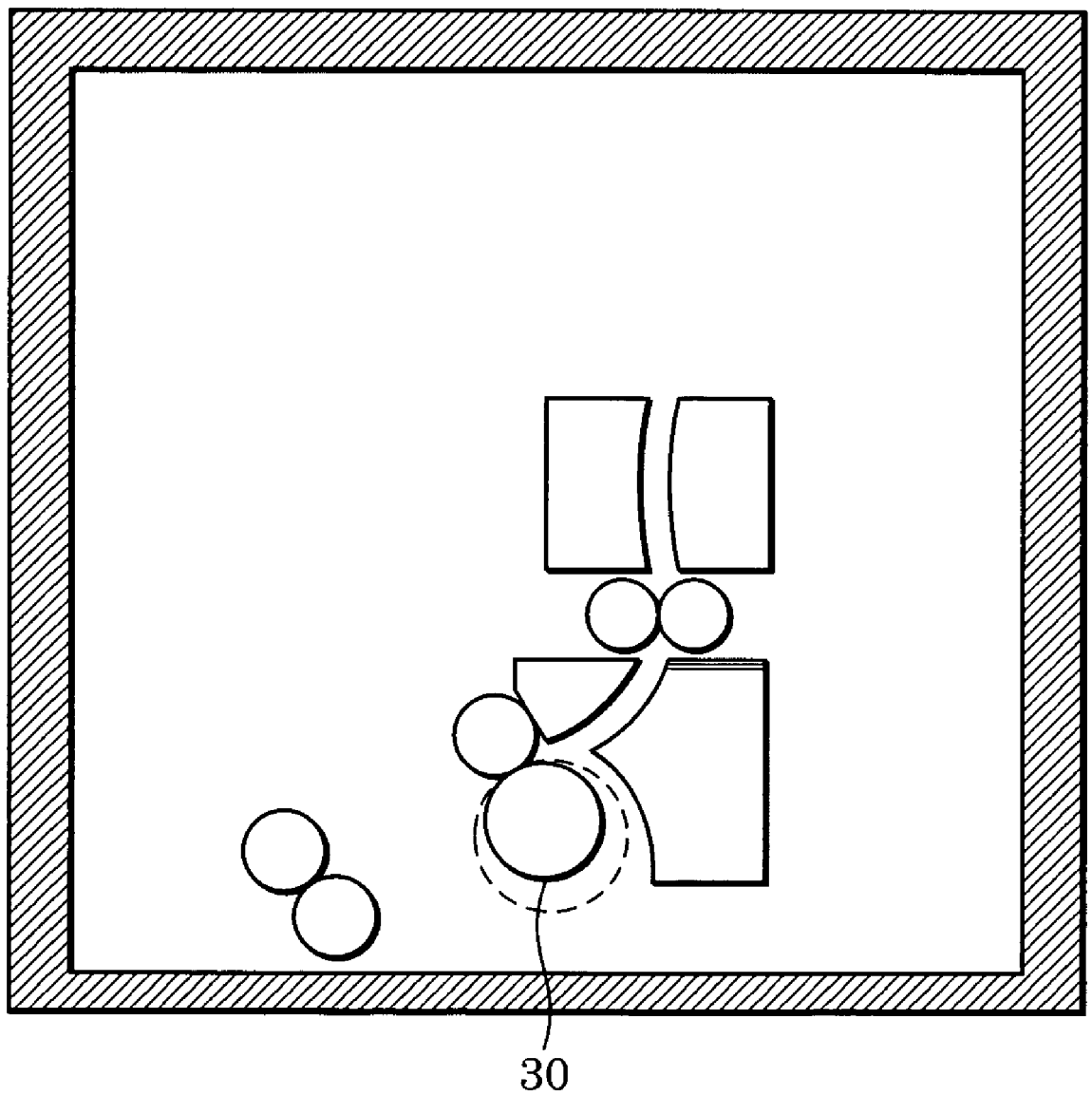
FIG. 16 is a diagram showing an example in which line data is automatically corrected on a sheet line diagram resulting from a simulation.
Figure 17:
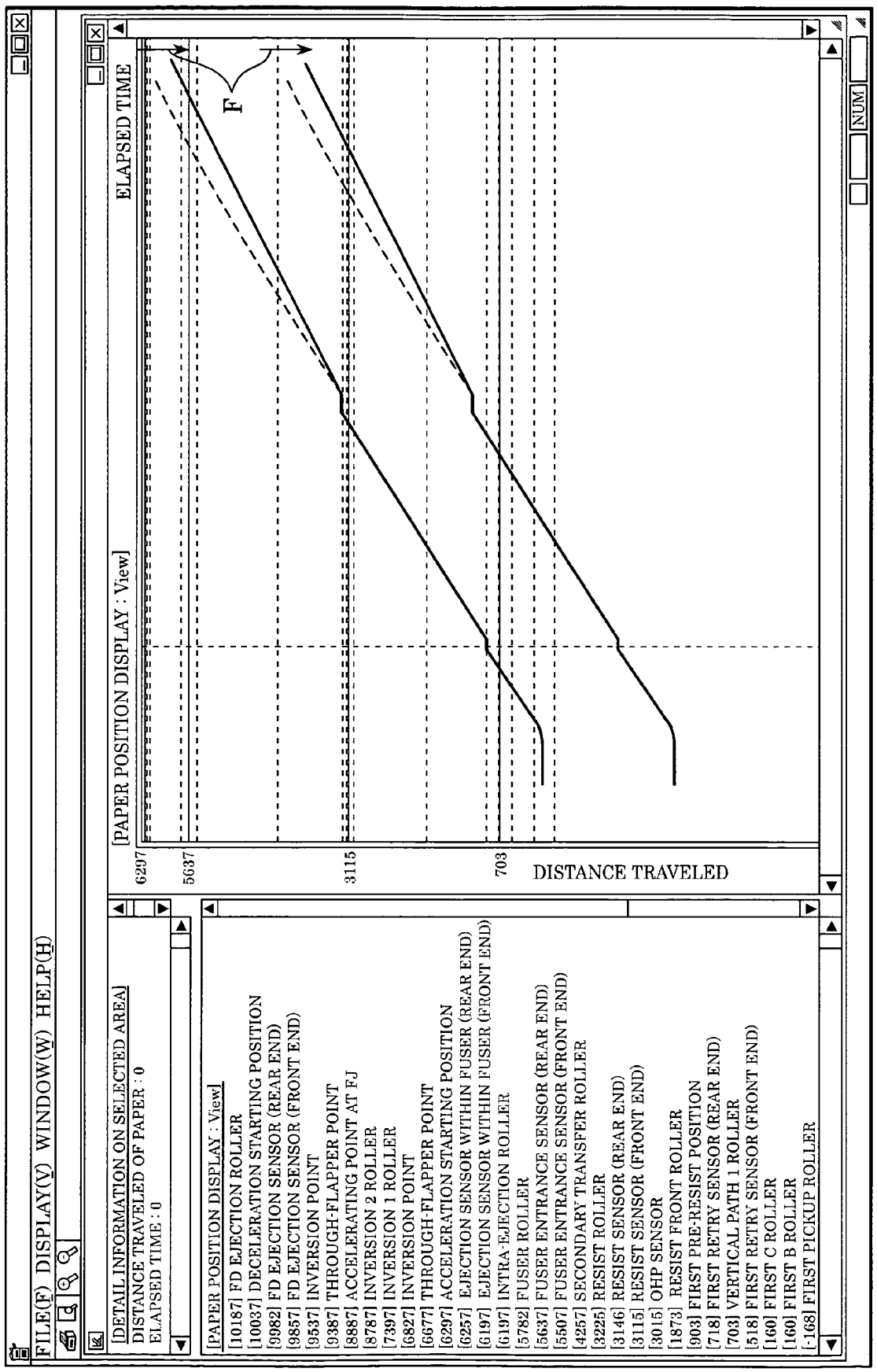
FIG. 17 is a diagram showing an example of a sheet line diagram resulting from a simulation.

Next, a second embodiment will be described with reference to FIGS. 15 and 16 showing input screens for parameters of design information and FIG. 17 showing a display screen of simulation results. Since the construction and simulation steps, which will not be described below, are the same as those of the first embodiment, the description will be omitted herein.

FIG. 15 is a display screen of the display apparatus 18. A 3D-model example of a feeder unit is displayed on the display screen as design information (design diagram) of a three-dimensional space. FIG. 16 shows a section diagram of the 3D model shown in FIG. 15. FIG. 17 shows a sheet line diagram on the screen of the display apparatus 18, which is one of simulation results.

Since the fact that design data input first can be automatically corrected by correcting line data in FIG. 17 showing a sheet line diagram indicating a sheet feeding distance with respect to a sheet feeding time, which is a simulation result, is the same as that of the first embodiment, the description will be omitted herein.

According to the second embodiment, processing, which will be described below, is further implemented.

According to this embodiment, when a parameter of design information of a three-dimensional space (3D-model) is corrected with respect to simulated data, the central processing unit 17 performs an operation with the changed parameter in real time. Then, the simulation results can be automatically corrected.

For example, it is assumed that the diameter of a roller 30 in the 3D model shown in FIG. 15 is slightly corrected from the dashed line to the solid line after a simulation. In this case, the diameter of the roller 30 on the section diagram in FIG. 16 of the 3D model is also automatically corrected (from the dashed line to the solid line). Furthermore, the central processing unit 17 performs an operation (simulation) with the changed diameter data of the roller 30. Thus, the slope (sheet feeding speed) of a part of the sheet line diagram shown in FIG. 17, which is a simulation result, can be corrected downward like the arrow F (meaning the change from the dashed line to the solid line) in accordance with an increase in diameter of the roller 30.

Also in this case, like the first embodiment, a roller diameter, which is first input design information, and/or a sheet line diagram, which is a simulation result display, are represented by a dashed line, for example. Thus, the change can be recognized immediately, and, at the same time, the roller diameter, which is the first design information, and the sheet line diagram can be returned to the original slope.

As described above, according to this embodiment, data resulting from one simulation can be changed in accordance with a change in design without another simulation from the beginning. Thus, the simulation results can be examined immediately. Therefore, the efficiency of sheet feeding design can be also improved.

Furthermore, simulation results in accordance with a change in parameters in design information can be obtained immediately. Thus, the most time-consuming determination of a parameter to be changed for efficient processing can be performed easily, which may reduce the design time significantly.

While design information of a sheet feeder mechanism, for example, has been described above according to this embodiment, the present invention is applicable to design information (design drawings) of all apparatus.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-316942 filed Sep. 9, 2003, which is hereby incorporated by reference herein.

What is claimed is:

1. An information processor comprising:
   a control device for implementing a simulation based on a design model of a unit which is a sheet feeding mechanism; and
   an output device for outputting a result of the simulation implemented by the control device on a display screen as a graph including a line that represents a sheet feeding distance with respect to a sheet feeding time, and a diagram of the design model;
   wherein the control device corrects a diameter of a roller for feeding a sheet included in the design model of the unit, in accordance with a correction of the line of the graph displayed on the display screen, and the diagram of the design model represents the roller before and after the correction.

2. The information processor according to claim 1, wherein the control device further corrects drive control information about the unit.

3. The information processor according to claim 1, wherein the design model of the unit is data on a three-dimensional space.

4. The information processor according to claim 1, wherein the graph displayed on the display screen is corrected in accordance with a change in the design model of the unit.

5. An information processing method comprising the steps of:
   implementing a simulation based on a design model of a unit which is a sheet feeding mechanism;
   outputting a result of the implemented simulation on a display screen as a graph including a line that represents a sheet feeding distance with respect to a sheet feeding time, and a diagram of the design model; and
   correcting a diameter of a roller for feeding a sheet included in the design model of the unit in accordance with a correction of the line of the graph displayed on the display screen,
   wherein the diagram of the design model represents the roller before and after the correction.

6. The information processing method according to claim 5, wherein drive control information about the unit is further corrected.

7. The information processing method according to claim 5, wherein the graph displayed on the display screen is corrected in accordance with a change in the design model of the unit.

8. A computer-readable memory for storing program code for performing a computer information method when the program code is executed, the computer-readable memory including:
   implementation code for implementing a simulation based on a design model of a unit which is a sheet feeding mechanism;
   output code for outputting a result of the implemented simulation on a display screen as a graph including a line that represents a sheet feeding distance with respect to a sheet feeding time, and a diagram of the design model;
   correction code for correcting a diameter of a roller for feeding a sheet included in the design model of the unit in accordance with a correction of the line of the graph displayed on the display screen,
   wherein the diagram of the design model represents the roller before and after the correction.

9. The computer-readable memory according to claim 8, wherein drive control information about the unit is further corrected.

10. The computer-readable memory according to claim 8, wherein the graph displayed on the display screen is corrected in accordance with a change in the design model of the unit.

* * * * *